United States Patent
Jauzein et al.

(10) Patent No.: US 10,611,919 B2
(45) Date of Patent: Apr. 7, 2020

(54) SALT-FREE COMPOSITE MARKING BASED ON CHIRAL LIQUID CRYSTAL PRECURSORS COMPRISING CHIRAL ACRYLATE DOPANTS

(71) Applicant: SICPA HOLDING SA, Prilly (CH)

(72) Inventors: Tristan Jauzein, Vevey (CH); Sabine Mayade, Thonon les Bains (FR)

(73) Assignee: SICPA HOLDING SA, Prilly (CH)

( * ) Notice: Subject to any disclaimer, the term of this patent is extended or adjusted under 35 U.S.C. 154(b) by 759 days.

(21) Appl. No.: 15/034,885

(22) PCT Filed: Nov. 6, 2014

(86) PCT No.: PCT/EP2014/073890
§ 371 (c)(1),
(2) Date: May 6, 2016

(87) PCT Pub. No.: WO2015/067683
PCT Pub. Date: May 14, 2015

(65) Prior Publication Data
US 2016/0264792 A1    Sep. 15, 2016

Related U.S. Application Data

(60) Provisional application No. 61/901,797, filed on Nov. 8, 2013.

(30) Foreign Application Priority Data

Nov. 8, 2013    (WO) .................. PCT/EP2014/073890

(51) Int. Cl.
C09D 11/03    (2014.01)
C09D 4/06    (2006.01)
(Continued)

(52) U.S. Cl.
CPC ............... *C09D 11/03* (2013.01); *B41M 3/14* (2013.01); *B41M 5/281* (2013.01); *B42D 25/00* (2014.10);
(Continued)

(58) Field of Classification Search
None
See application file for complete search history.

(56) References Cited

U.S. PATENT DOCUMENTS 5,678,863 A    10/1997    Knight et al.
6,207,240 B1    3/2001    Schoenfeld et al.
(Continued)

FOREIGN PATENT DOCUMENTS

EP    0216712 A1    4/1987
EP    0847432 B1    6/2001
(Continued)

OTHER PUBLICATIONS

J.L. Fergason, Molecular Crystals, vol. 1, pp. 293-307 (1966).
(Continued)

*Primary Examiner* — Scott R. Walshon
*Assistant Examiner* — Sathavaram I Reddy
(74) *Attorney, Agent, or Firm* — Muncy, Geissler, Olds & Lowe, P.C.

(57)    ABSTRACT

Disclosed is a substrate which has thereon a marking or layer comprising a salt-free cured chiral liquid crystal precursor composition which comprises one or more nematic compounds A and one or more chiral dopant compounds B which are capable of giving rise to a cholesteric state of the chiral liquid crystal precursor composition and are of formula (I) as set forth herein. A modifying resin made from one or more polymerizable monomers comprising an average of at least one ether functionality per polymerizable group is disposed between the substrate and the marking or layer and in (Continued)

contact with the marking or layer in one or more areas thereof. The modifying resin changes the position of a selective reflection band exhibited by the cured chiral liquid crystal precursor composition on the substrate in the one or more areas.

17 Claims, 2 Drawing Sheets

(51) Int. Cl.
| | |
|---|---|
| *C09D 11/107* | (2014.01) |
| *C09K 19/58* | (2006.01) |
| *C09K 19/38* | (2006.01) |
| *C09K 19/02* | (2006.01) |
| *B42D 25/00* | (2014.01) |
| *B42D 25/364* | (2014.01) |
| *B41M 5/28* | (2006.01) |
| *B41M 3/14* | (2006.01) |
| *C09K 19/04* | (2006.01) |
| *C09K 19/34* | (2006.01) |

(52) U.S. Cl.
CPC ............ *B42D 25/364* (2014.10); *C09D 4/06* (2013.01); *C09D 11/107* (2013.01); *C09K 19/02* (2013.01); *C09K 19/38* (2013.01); *C09K 19/3809* (2013.01); *C09K 19/586* (2013.01); *C09K 19/588* (2013.01); *C09K 2019/0448* (2013.01); *C09K 2019/3408* (2013.01); *C09K 2219/03* (2013.01)

(56) References Cited

U.S. PATENT DOCUMENTS

| | | | |
|---|---|---|---|
| 6,589,445 | B2 | 7/2003 | Sugiyama et al. |
| 2006/0257633 | A1 | 11/2006 | Inoue et al. |
| 2007/0224341 | A1 | 9/2007 | Kuntz et al. |
| 2011/0101088 | A1* | 5/2011 | Marguerettaz ....... B41M 7/0081 235/375 |
| 2011/0135890 | A1 | 6/2011 | Tiller et al. |
| 2012/0141697 | A1 | 6/2012 | Callegari et al. |
| 2012/0141745 | A1 | 6/2012 | Callegari et al. |

FOREIGN PATENT DOCUMENTS

| | | |
|---|---|---|
| EP | 1681586 A1 | 7/2006 |
| EP | 1381520 B1 | 8/2006 |
| EP | 1876216 A1 | 1/2008 |
| JP | 2009300662 A | 12/2009 |
| WO | 9322397 A1 | 11/1993 |
| WO | 9522586 A1 | 8/1995 |
| WO | 2001024106 A1 | 4/2001 |
| WO | 2008127950 A2 | 10/2008 |

OTHER PUBLICATIONS

International Preliminary report on Patentability issued with respect to application No. PCT/EP2014/073890, dated May 10, 2016.

* cited by examiner

SALT-FREE COMPOSITE MARKING BASED ON CHIRAL LIQUID CRYSTAL PRECURSORS COMPRISING CHIRAL ACRYLATE DOPANTS

BACKGROUND OF THE INVENTION

1. Field of the Invention

The present invention relates to a composite marking based on chiral nematic (also called cholesteric) liquid crystal precursors and in particular, a marking wherein a modifying resin changes the position of the selective reflection band exhibited by a cured chiral liquid crystal precursor composition in the chiral liquid crystal state. The invention also relates to a method of providing a substrate with the composite marking and to a method of changing the selective reflection band exhibited by a cured chiral liquid crystal precursor composition on a substrate.

2. Discussion of Background Information

Counterfeit is no longer a national or a regional problem but a worldwide problem which has an impact not only on manufacturers but also on the consumer. Counterfeiting is a significant problem with goods like clothes and watches but becomes even more serious when it affects medicines and drugs. Each year thousands of people around the world die because of counterfeit drugs. Counterfeiting has also an impact on government revenues in that it affects the collection of taxes for, e.g., cigarettes and alcohol because of the existence of a black market where it is impossible to track and trace counterfeit (smuggled, diverted, etc.) products with no valid tax stamps.

Many solutions have been proposed to make counterfeiting impossible or at least very difficult and/or costly, for example RFID solutions and the use of invisible inks.

More recently, a security feature has emerged and is used to authenticate a genuine product such as a drug and to avoid counterfeiting. This technology is based on optically variable inks. Its principle is based on the difference in observable color of a marking made with optically variable inks when a packaging, security document, etc. carrying the marking is viewed from different angles ("viewing-angle dependent color").

Optically variable inks provide first-line recognizability not only by a person, but also facilitate machine-readability. Many patents describe this security product, its composition and its application. One example of the many types of optically variable inks is the class of compounds called cholesteric liquid crystals. When illuminated with white light, the cholesteric liquid crystal structure reflects light of a certain color which depends on the material in question and generally varies with the viewing angle and the temperature. The cholesteric material itself is colorless and the observed color is the result of a physical reflection effect at the cholesteric helical structure that is adopted by the liquid crystal precursor composition at a given temperature. See, e.g., J. L. Fergason, Molecular Crystals, Vol. 1, pp. 293-307 (1966).

EP-A-1 381 520 and EP-A-1 681 586 disclose a birefringent marking and a method of applying the same in the form of a liquid crystal layer having a non-uniform pattern of regions of different thickness. The applied liquid crystal coating or layer may provide for a hidden image on a reflected substrate, which image is invisible when viewed under non-polarized light but is rendered visible under polarized light or with the help of a polarization filter.

U.S. Pat. No. 5,678,863 discloses means for the identification of documents of value which include a paper or polymer region, said region having a transparent and translucent characteristic. A liquid crystal material is applied to the region to produce an optical effect, which differs when viewed in transmitted and reflected light. The liquid crystal material is in liquid form at room temperature and must be enclosed in a containing means such as microcapsules in order to be suitable for use in a printing process such as gravure, roller, spray or ink-jet printing.

The ordered liquid crystalline state depends upon the presence of a chiral dopant. Nematic liquid crystals without chiral dopant show a molecular arrangement that is characterized by its birefringence. Nematic polymers are known from, e.g., EP-A-0 216 712, EP-A-0 847 432, and U.S. Pat. No. 6,589,445.

As mentioned above, the liquid crystal based security feature provides first-line recognizability by the consumer and also by retailers and producers of goods and articles. Like for many other security features which are used in the market, there is always the temptation for counterfeiters to reproduce these security features and therefore misleads consumers and retailers. In view of the foregoing facts, there continues to be a need to improve the security of liquid crystal polymer materials based on liquid crystal precursors.

One possibility of enhancing the security level of a chiral liquid crystal polymer film would appear to be superposing a code in the form of a pattern, indicia, a bar code, etc. on the liquid crystal polymer film. However, there is always a risk that a counterfeiter tampers with the code and manually applies it onto the liquid crystal polymer film.

A second possibility of overcoming this problem is to insert the code inside the liquid crystal polymer film. For example, U.S. Pat. No. 6,207,240 describes an effect coating of a cholesteric liquid crystal polymer (CLCP) with viewing angle dependent reflection color that further comprises absorption type pigments exhibiting a specific absorption color. A marking, such as a symbol or a text, is generated in the CLCP coating by laser irradiation. The laser radiation carbonizes the CLCP material in the irradiated area. As a result, the color of the substrate on which the CLCP is coated, or the color of absorption pigments incorporated into the CLCP, becomes visible in the irradiated area. However, the method requires high-power lasers to carbonize the material and to make the markings visible.

Another possibility is described in US 2006/0257633 A1 which is applied not only to liquid crystal polymers but to polymers in general. The method consists of applying a permeating substance to a predetermined region on the surface of the polymer substrate and bringing a supercritical fluid into contact with the surface of the polymer substrate to which the permeating substance has been applied to cause the permeating substance to permeate into the polymer substrate. The method makes it possible to selectively (partially) modify a portion of the surface of the polymer. However, for industrial processes where a high marking speed for a large number of items is required the method is complex and expensive to implement.

One of the drawbacks of the methods cited above is the lack of ability to modify the chiral liquid crystal polymer layer in a selective and controlled manner and to create a strong and reliable marking or coding that is difficult, if not impossible, to reproduce and also is compatible with a production line (processes for making items such as passports, packaging, etc.).

US 2012/0141697 A1 discloses a substrate having thereon a marking or layer that comprises a cured chiral liquid crystal precursor composition. The chiral liquid crystal precursor composition comprises at least one salt that changes the position of a selective reflection band exhibited by the cured composition compared to a position of the selective reflection band exhibited by the cured composition that does not contain the at least one salt. Further, a modifying resin made from one or more polymerizable monomers is disposed between the substrate and the marking or layer and in contact with the marking or layer in one or more areas thereof. This modifying resin changes the position of the selective reflection band exhibited by the cured chiral liquid crystal precursor composition comprising the at least one salt on the substrate in the one or more areas in which it is disposed between the substrate and the marking or layer.

The problem underlying the present invention is to improve the substrate disclosed in US 2012/0141697 A1, and in particular, to enhance the selective reflection band exhibited by the cured chiral liquid crystal precursor composition whose position has been changed by the modifying resin to thereby obtain an enhanced color and a better contrast of the marking. Another problem underlying the invention is to increase the achievable production rate of the marking and make it compatible with supply chain production in fields such as pharmaceuticals and cigarettes where the number of units (packages) to be processed per time unit is particularly high.

SUMMARY OF THE INVENTION

It has unexpectedly been found that the above problems can be solved by providing the chiral liquid crystal precursor composition in salt-free form that contains a particular class of chiral dopant compounds and by using a particular type of modifying resin.

Accordingly, the present invention provides a substrate having thereon a marking or layer that comprises a salt-free chiral liquid crystal precursor composition in the chiral liquid crystal state in cured (hardened) form. The chiral liquid crystal precursor composition comprises (i) one or more nematic compounds A and (ii) one or more chiral dopant compounds B which are capable of giving rise to a cholesteric state of the chiral liquid crystal precursor composition and are of formula (I) set forth below.
Further, (a) a modifying resin made from one or more polymerizable monomers comprising an average of at least one ether functionality (—C—O—C—) per polymerizable group; and/or (b) a modifying resin with ether functionalities comprising at least one unit of formula (II):

—[CH($R^1$)—(CH($R^2$))$_n$—O]$_m$—  (II)

wherein n is 0 or an integer of from 1 to 4, m is an integer of from 2 to 20, and $R^1$ and $R^2$ may be independently be hydrogen or $C_{1-4}$ alkyl (such as methyl, ethyl, propyl and butyl); is disposed between the substrate and the marking or layer and in contact with the marking or layer in one or more areas thereof. The modifying resin changes the position of the selective reflection band exhibited by the cured (salt-free) chiral liquid crystal precursor composition (when in a chiral liquid crystal state) on the substrate in the one or more areas.

The present invention also provides a marking or layer that is locally modified by a modifying resin as such (i.e., without the presence of a substrate). The term "modifying resin" as used in the present specification and in the appended claims includes cured resins as set forth below, and also includes aqueous resins such as, e.g., polyacrylates.

In one aspect, the chiral liquid crystal precursor composition may comprise one or more (e.g. two, three, four, five or more and in particular, at least two) different nematic compounds A and one or more (e.g., two, three, four, five or more) different chiral dopant compounds B (preferably all of which are of formula (I)) which are capable of giving rise to a cholesteric state of the chiral liquid crystal precursor composition upon heating. Further, the one or more nematic compounds A may comprise at least one compound which comprises at least one polymerizable group. For example, all of the one or more nematic compounds A may comprise at least one polymerizable group. The at least one polymerizable group may, for example, comprise a group which is able to take part in a free radical polymerization and in particular, a (preferably activated) unsaturated carbon-carbon bond such as, e.g., a group of formula $H_2C$=CH—C(O)— or of formula $H_2C$=C($CH_3$)—C(O)—.

The one or more chiral dopant compounds B comprised in the chiral liquid crystal precursor composition comprise one or more chiral dopant compounds (B) of formula (I):

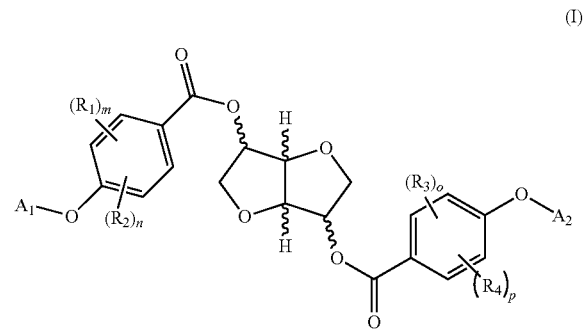

(I)

herein:
$R_1$, $R_2$, $R_3$, and $R_4$ each independently denote $C_1$-$C_6$ alkyl and $C_1$-$C_6$ alkoxy;
$A_1$ and $A_2$ each independently denote a group of formula —[($CH_2$)$_y$—O]$_z$—C(O)—CH=$CH_2$;
m, n, o, and p each independently denote 0, 1, or 2;
y denotes 0, 1, 2, 3, 4, 5, or 6; and
z equals 0 if y equals 0 and z equals 1 if y equals 1 to 6.

In aspects of the compounds of formula (I), y may equal 0 and/or the total number of carbon atoms in $R_1$, $R_2$, $R_3$, and $R_4$ may not exceed 8 and/or $R_1$, $R_2$, $R_3$, and $R_4$ may each independently denote $C_1$-$C_3$ alkyl or $C_1$-$C_3$ alkoxy and/or at least two (e.g., at least three or all) of m, n, o, and p may denote 0.

In yet another aspect of the substrate/marking of the present invention, at least one of the one or more polymerizable monomers comprising an average of at least one ether functionality (e.g., an average of at least two ether functionalities or at least three ether functionalities) per polymerizable group for providing the modifying resin (a) that changes the position of the selective reflection band exhibited by the (salt-free) cured chiral liquid crystal precursor composition may comprise at least two unsaturated carbon-carbon bonds and/or at least one of these one or more polymerizable monomers comprising an average of at least one ether functionality per polymerizable group may comprise at least one polymerizable group of formula H$_2$C=CH—C(O)— or of formula H$_2$C=C(CH$_3$)—C(O)—.

In a still further aspect, the one or more polymerizable monomers for the modifying resin (a) may comprise an average of at least four ether functionalities per polymerizable group. Further, the ether functionalities of the one or more polymerizable monomers comprising an average of at least one ether functionality per polymerizable group may be provided by one or more alkyleneoxy units having 2, 3 or 4 carbon atoms such as, for example, ethyleneoxy groups (—CH$_2$—CH$_2$—O—) and/or propyleneoxy groups (—CH$_2$—CH$_2$—CH$_2$—O— and/or —CH$_2$—CH(CH$_3$)—O—).

In another aspect, at least 80 mole-% of the one or more polymerizable monomers for making the modifying resin (a) may comprise at least one ether functionality and/or at least 90 mole-% of the one or more polymerizable monomers for making the modifying resin may comprise at least four ether functionalities.

For example, at least one of the one or more polymerizable monomers having an average of at least one ether functionality per polymerizable group for providing the modifying resin (a) may comprise one or more polymerizable groups (e.g., one, two, three, four, five, six, or more groups) of formula H$_2$C=CH—C(O)— or H$_2$C=C(CH$_3$)—C(O)—. Non-limiting examples of corresponding monomers include polyether acrylates, modified polyether acrylates (such as, e.g., amine-modified polyether acrylates), polyester acrylates, modified polyester acrylates (such as, e.g., amine-modified polyester acrylates), hexafunctional polyester acrylates, tetrafunctional polyester acrylates, aromatic difunctional urethane acrylates, aliphatic difunctional urethane acrylates, aliphatic trifunctional urethane acrylates, aliphatic hexafunctional urethane acrylates, urethane monoacrylates, aliphatic diacrylates, bisphenol A epoxy acrylates, modified bisphenol A epoxy acrylates, epoxy acrylates, modified epoxy acrylates (such as, e.g., fatty acid modified epoxy acrylates), acrylic oligomers, hydrocarbon acrylate oligomers, ethoxylated phenol acrylates, polyethylene glycol diacrylates, propoxylated neopentyl glycol diacrylates, diacrylated bisphenol A derivatives, polyethylene glycol diacrylates, propoxylated neopentyl glycol diacrylates, dipropylene glycol diacrylate, tripropylene glycol diacrylate, polyether tetraacrylates, ethoxylated ditrimethylolpropane tetraacrylate, ethoxylated dipentaerythritol hexaacrylate, mixtures of ethoxylated pentaerythritol tri- and tetraacrylates, dipropylene glycol diacrylate, ethoxylated trimethylol propane triacrylates, tripropylene glycol diacrylate, and ethoxylated bisphenol A diacrylates.

Regarding the above modifying resin (b), R$^1$ and R$^2$ in formula (II) may, for example, both be hydrogen and/or n may be 1, 2 or 3. For example, R$^1$ and R$^2$ in formula (II) may both be hydrogen and n may be 1.

In another aspect of the substrate/marking of the present invention the modifying resin for changing the position of the selective reflection band exhibited by the (salt-free) cured chiral liquid crystal precursor composition may comprise a radiation-cured resin, for example, a UV-cured resin.

In another aspect, the modifying resin may shift the position of the selective reflection band exhibited by the salt-free cured chiral liquid crystal precursor composition by at least 5 nm and/or may shift the position to shorter wavelengths or may shift the position to shorter wavelength and/or the shifted position of the selective reflection band may be in the visible range. In this regard, it is noted that "shifting the position of the selective reflection band" as used herein and in the appended claims means shifting max as measured using an analytical spectral device that measures the reflectance of a sample in the infrared-near-infrared-visible-UV range of the spectrum, such as the LabSpec Pro device made by Analytical Spectral Devices Inc. of Boulder, Colo.

In yet another aspect, at least one of the one or more areas of the substrate which carry the modifying resin may be in the form of at least one of an image, a picture, a logo, indicia, and a pattern representing a code selected from one or more of a 1-dimensional barcode, a stacked 1-dimensional barcode, a 2-dimensional barcode, a 3-dimensional barcode, and a data matrix, and/or at least a part of the cured chiral liquid crystal precursor composition may be in the form of at least one of an image, a picture, a logo, indicia, and a pattern representing a code selected from one or more of a 1-dimensional barcode, a stacked 1-dimensional barcode, a 2-dimensional barcode, a 3-dimensional barcode, and a data matrix.

In a still further aspect, the substrate of the present invention may be or comprise at least one of a label, packaging, a cartridge, a container or a capsule that contains pharmaceuticals, nutraceuticals, foodstuffs or a beverage (such as, e.g., coffee, tea, milk, chocolate, etc.), a banknote, a credit card, a stamp, a tax label, a security document, a passport, an identity card, a driver's license, an access card, a transportation ticket, an event ticket, a voucher, an ink-transfer film, a reflective film, an aluminum foil, and a commercial good. The marking according to the present invention can also be created on a substrate such as, e.g., a film or sheet of polyethylene terephthalate (PET) or polyolefin such as polyethylene for later transfer to a permanent substrate (e.g., one of the substrates set forth in the preceding sentence). In this regard, it is to be appreciated that the surface of the substrate used in the present invention may already have been provided with a neutral resin (i.e., not a modifying resin) before the modifying resin is applied thereto.

The present invention further provides a method of providing a marking on a substrate. The method comprises the application of a curable salt-free chiral liquid crystal precursor composition which comprises (i) one or more nematic compounds A and (ii) one or more chiral dopant compounds B which are capable of giving rise to a cholesteric state of the chiral liquid crystal precursor composition and are of formula (I) as set forth above onto a surface of a substrate which carries in one or more areas of the surface of the substrate a modifying resin made from one or more polymerizable monomers which comprise an average of at least one ether functionality (—C—O—C—) per polymerizable group (and/or a modifying resin (b) as set forth above). The modifying resin is capable of changing the position of the selective reflection band exhibited by the salt-free cured chiral liquid crystal precursor composition on the substrate in the one or more areas in which it is present. The curable chiral liquid crystal precursor composition is applied in such a way that the composition covers at least a part of the one or more areas that carry the modifying resin and also covers at least one area of the surface of the substrate that does not carry the modifying resin. The method further comprises the heating of the applied chiral liquid crystal precursor composition to bring same to a chiral liquid crystal state; and the curing of the composition in the chiral liquid crystal state (e.g., by radiation, such as UV-radiation).

In one aspect of the method of the present invention, the chiral liquid crystal precursor composition may be heated to a temperature of from about 55° C. to about 150° C., preferably from about 60° C. to about 120° C. and more preferably from about 60° C. to about 90° C., to bring the chiral liquid crystal precursor composition to a chiral liquid crystal state.

In another aspect of the method, the liquid crystal precursor composition may be applied onto the substrate by at least one of spray coating, knife coating, roller coating, screen coating, curtain coating, gravure printing, flexography, screen-printing, pad printing, and ink-jet printing (for example, drop-on-demand ink-jet printing, valve-jet printing), and/or may be applied in the form of at least one of an image, a picture, a logo, indicia, and a pattern representing a code selected from one or more of a 1-dimensional barcode, a stacked 1-dimensional barcode, a 2-dimensional barcode, a 3-dimensional barcode, and a data matrix.

In yet another aspect, the modifying resin may be present in at least one of the one or more areas in the form of at least one of an image, a picture, a logo, indicia, and a pattern representing a code selected from one or more of a 1-dimensional barcode, a stacked 1-dimensional barcode, a 2-dimensional barcode, a 3-dimensional barcode, and a data matrix and/or may have been provided on the substrate by at least one of continuous ink-jet printing, drop-on-demand ink-jet printing, valve-jet printing, spray printing, flexography, gravure printing, offset, dry offset printing, letterpress printing, pad printing and screen printing.

In a still further aspect, the substrate may be or may comprise at least one of a label, packaging, a cartridge, a container or a capsule that contains pharmaceuticals, nutraceuticals, foodstuffs or a beverage (such as, e.g., coffee, tea, milk, chocolate, etc.), a banknote, a credit card, a stamp, a tax label, a security document, a passport, an identity card, a driver's license, an access card, a transportation ticket, an event ticket, a voucher, an ink-transfer film, a reflective film, an aluminum foil, and a commercial good.

In another aspect, the modifying resin may be capable of shifting the position of the selective reflection band exhibited by the (salt-free) cured chiral liquid crystal precursor composition on the substrate by at least 5 nm.

In another aspect of the method of the present invention, the chiral liquid crystal precursor composition may comprise one or more (e.g. two, three, four, five or more and in particular, at least two) different nematic compounds A and one or more (e.g., two, three, four, five or more) different chiral dopant compounds B which are capable of giving rise to a cholesteric state of the chiral liquid crystal precursor composition upon heating and are of formula (I) set forth above. Further, the one or more nematic compounds A may comprise at least one compound which comprises at least one polymerizable group. For example, all of the one or more nematic compounds A and all of the one or more chiral dopant compounds B may comprise at least one polymerizable group. The at least one polymerizable group of the nematic compound(s) A may, for example, comprise a group which is able to take part in a free radical polymerization and in particular, a (preferably activated) unsaturated carbon-carbon bond such as, e.g., a group of formula $H_2C=CH-C(O)-$.

In a still further aspect of the method of the present invention, at least one of the one or more polymerizable monomers having an average of at least one ether functionality per polymerizable group for providing the above modifying resin (a) that changes the position of the selective reflection band exhibited by the cured (salt-free) chiral liquid crystal precursor composition may comprise at least two unsaturated carbon-carbon bonds. For example, at least one of the one or more polymerizable monomers for providing the modifying resin may comprise one or more groups (e.g., one, two, three, four, five, six, or more groups) of formula $H_2C=CH-C(O)-$ or $H_2C=C(CH_3)-C(O)-$. Non-limiting examples of corresponding monomers include polyether acrylates, modified polyether acrylates (such as, e.g., amine-modified polyether acrylates), polyester acrylates, modified polyester acrylates (such as, e.g., amine-modified polyester acrylates), hexafunctional polyester acrylates, tetrafunctional polyester acrylates, aromatic difunctional urethane acrylates, aliphatic difunctional urethane acrylates, aliphatic trifunctional urethane acrylates, aliphatic hexafunctional urethane acrylates, urethane monoacrylates, aliphatic diacrylates, bisphenol A epoxy acrylates, modified bisphenol A epoxy acrylates, epoxy acrylates, modified epoxy acrylates (such as, e.g., fatty acid modified epoxy acrylates), acrylic oligomers, hydrocarbon acrylate oligomers, ethoxylated phenol acrylates, polyethylene glycol diacrylates, propoxylated neopentyl glycol diacrylates, diacrylated bisphenol A derivatives, polyethylene glycol diacrylates, propoxylated neopentyl glycol diacrylates, dipropylene glycol diacrylate, tripropylene glycol diacrylate, polyether tetraacrylates, ethoxylated ditrimethylolpropane tetraacrylate, ethoxylated dipentaerythritol hexaacrylate, mixtures of ethoxylated pentaerythritol tri- and tetraacrylates, dipropylene glycol diacrylate, ethoxylated trimethylol propane triacrylates, tripropylene glycol diacrylate, and ethoxylated bisphenol A diacrylates.

In another aspect of the method of the present invention, the modifying resin (a) or (b) may comprise a radiation-cured resin, for example, a UV-cured resin. In another aspect of the method of the present invention, the modifying resin may comprise an aqueous resin which may be dried by conventional means such as heat.

The present invention further provides a substrate that is provided with a marking, wherein the substrate is obtainable by the method of the present invention as set forth above (including the various aspects thereof).

The present invention also provides a method of shifting the position of the selective reflection band exhibited by a salt-free chiral liquid crystal precursor made from a composition comprising one or more nematic compounds and one or more chiral dopant compounds which are capable of giving rise to a cholesteric state of the chiral liquid crystal precursor composition and are of formula (I) set forth above. The method comprises contacting the chiral liquid crystal precursor composition with a modifying resin (a) which is made from one or more polymerizable monomers which comprise an average of at least one ether functionality (—C—O—C—) per polymerizable group and is capable of changing the position of the selective reflection band exhibited by the cured chiral liquid crystal precursor composition (and/or a modifying resin (b) as set forth above). The chiral liquid crystal precursor composition is then heated to a temperature of from about 55° C. to about 150° C., preferably from about 60° C. to about 120° C., more preferably from about 60° C. to about 90° C., to bring it to a chiral liquid crystal state.

Thereafter the chiral liquid crystal precursor composition is cured.

In one aspect of the method, the position of the selective reflection band may be shifted by at least 5 nm. Other aspects of the method such as, e.g., aspects relating to compounds A and compounds B include those set forth above with respect to the substrate/marking of the present invention.

BRIEF DESCRIPTION OF THE DRAWINGS

The present invention is further described in the detailed description which follows, in reference to the plurality of drawings by way of non-limiting examples of exemplary embodiments of the present invention, and wherein.

DETAILED DESCRIPTION OF THE PRESENT INVENTION

Figure 1:
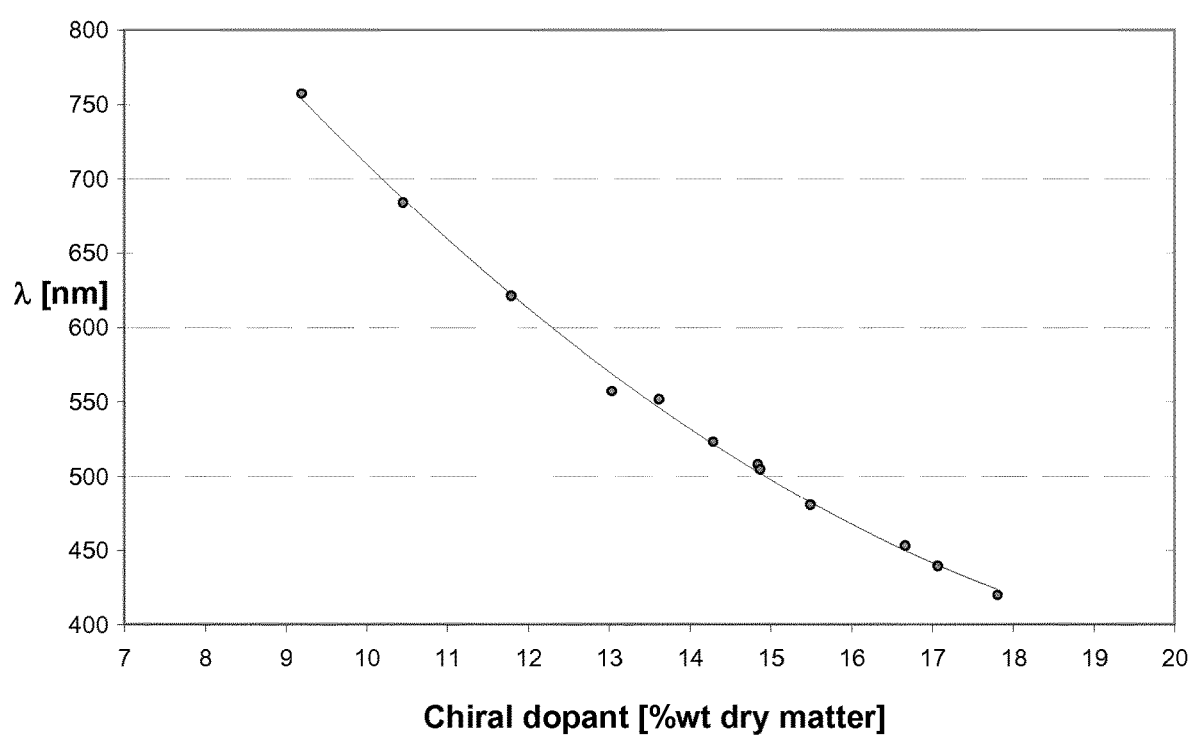
FIG. 1 is a diagram showing the position of the selective reflection band ($\lambda_{max}$) of a cured chiral liquid crystal precursor composition suitable for use in the present invention as a function of the concentration of the chiral dopant contained therein, based on dry matter.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The substrate for use in the present invention is not particularly limited and can be of various types. The substrate may, for example, consist (essentially) of or comprise one or more of a metal (for example, in the form of a container such as a can a capsule or a closed cartridge for holding various items such as, e.g., nutraceuticals, pharmaceuticals, beverages or foodstuffs), a fabric, a coating, and equivalents thereof, glass (for example, in the form of a container such as a bottle for holding various items such as, e.g., nutraceuticals, pharmaceuticals, beverages or foodstuffs), cardboard (e.g., in the form of packaging), paper, and a polymeric material such as, e.g., PET or polyethylene (e.g., in the form of a container or as a part of a security document). It is pointed out that these substrate materials are given exclusively for exemplifying purposes, without restricting the scope of the invention. In general, any substrate (which may not necessarily be flat and may be uneven) whose surface is not soluble, or only slightly soluble, in solvent(s) used in the chiral liquid polymer precursor composition is a suitable substrate for the purposes of the present invention.

The substrate may advantageously have a dark or black surface or background onto which the precursor composition is to be applied. Without wishing to be bound by any theory, it is speculated that in the case of a dark or black background the light transmitted by the cholesteric liquid crystal material is largely absorbed by the background, whereby any residual backscattering from the background does not disturb the perception of the cholesteric liquid crystal material's own reflection with the unaided eye. In contrast, on a substrate with a light or white surface or background the reflection color of the cholesteric liquid crystal material is less visible when compared with a black or dark background, due to the strong backscattering from the background. However, even in the case of a light or white background a cholesteric liquid crystal material can be recognized with the help of a circular polarization filter because it selectively reflects only one of the two possible circular polarized light components, in accordance with its chiral helical structure. The substrate according to the present invention may further comprise additional security elements, such as organic and/or inorganic pigments, dyes, flakes, optically variable elements, magnetic pigments, etc.

The salt-free chiral liquid crystal precursor composition that is used for making the marking according to the present invention and is applied (e.g., deposited) onto at least a part of at least one surface of the substrate (and over at least a part of the modifying resin on the at least one surface of the substrate) comprises a mixture of (i) one or more nematic compounds A and (ii) one or more cholesteric (i.e., chiral dopant) compounds B which are capable of giving rise to a cholesteric state of the composition and are of formula (I) set forth above. The pitch of the obtainable cholesteric state depends on the relative ratio of the nematic and the cholesteric compounds. Typically, the (total) concentration of the one or more nematic compounds A in the chiral liquid crystal precursor composition for use in the present invention will be about four to about fifty times the (total) concentration of the one or more chiral dopant compounds B. Often, a chiral liquid crystal precursor composition with a high concentration of chiral dopant compounds B is not desirable (although possible in many cases) because the one or more chiral dopant compounds B tend to crystallize, thereby making it impossible to obtain the desired liquid crystal state having specific optical properties.

In this regard, it is to be understood that the term "salt-free" as used herein and in the appended claims means that the chiral liquid crystal precursor composition does not contain more than trace amounts of salt(s), e.g., not more than 0.1% by weight and preferably not more than 0.01% by weight, and preferably not more than 0.001% by weight, based on the solids content of the precursor composition. Most preferably, the composition is entirely free of salt or at least contains not more than 5 ppm of salt.

Nematic compounds A which are suitable for use in the chiral liquid crystal precursor composition are known in the art; when used alone (i.e., without cholesteric compounds) they arrange themselves in a state characterized by its birefringence. Non-limiting examples of nematic compounds A which are suitable for use in the present invention are described in, e.g., WO 93/22397, WO 95/22586, EP-B-0 847 432, U.S. Pat. No. 6,589,445, US 2007/0224341 A1 and JP 2009-300662 A.

A preferred class of nematic compounds for use in the present invention comprises one or more (e.g., 1, 2 or 3) polymerizable groups, identical or different from each other, per molecule. Examples of polymerizable groups include groups which are capable of taking part in a free radical polymerization and in particular, groups comprising a carbon-carbon double or triple bond such as, e.g., an acrylate moiety, a vinyl moiety or an acetylenic moiety. Particularly preferred as polymerizable groups are acrylate moieties.

The nematic compounds for use in the present invention further may comprise one or more (e.g., 1, 2, 3, 4, 5 or 6) optionally substituted aromatic groups, preferably phenyl groups. Examples of the optional substituents of the aromatic groups include those which are set forth herein as examples of substituent groups on the phenyl rings of the chiral dopant compounds of formula (I) such as, e.g., alkyl and alkoxy groups.

Examples of groups which may optionally be present to link the polymerizable groups and the aryl (e.g., phenyl) groups in the nematic compounds A include those which are exemplified herein for the chiral dopant compounds B of formula (I) (including those of formulae (IA), (IA'), (IB) and (IB') set forth below). For example, the nematic compounds A may comprise one or more groups of the formula indicated above as meaning for $A_1$ and $A_2$ in formula (I), typically bonded to optionally substituted phenyl groups. Specific non-limiting examples of nematic compounds which are suitable for use in the present invention are given below.

As set forth above, the one or more chiral dopant compounds B comprised in the chiral liquid crystal precursor composition for use in the present invention comprise (and preferably consist of) one or more chiral dopant compounds B of formula (I):

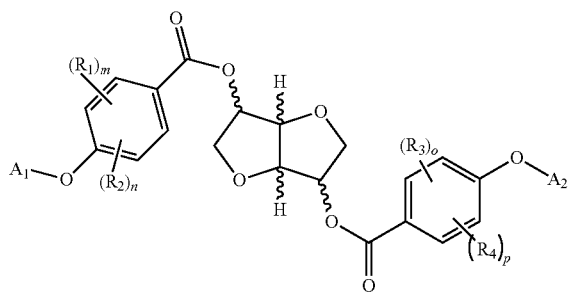

(I)

wherein:

$R_1$, $R_2$, $R_3$, and $R_4$ each independently denote $C_1$-$C_6$ alkyl and $C_1$-$C_6$ alkoxy;

$A_1$ and $A_2$ each independently denote a group of formula —$[(CH_2)_y$—O$]_z$—C(O)—CH=CH$_2$;

m, n, o, and p each independently denote 0, 1, or 2;

y denotes 0, 1, 2, 3, 4, 5, or 6; and z equals 0 if y equals 0 and z equals 1 if y equals 1 to 6.

Chiral dopant compounds B of formula (I) include compounds of the following formulae (IA), (IA'), (IB) and (IB'):

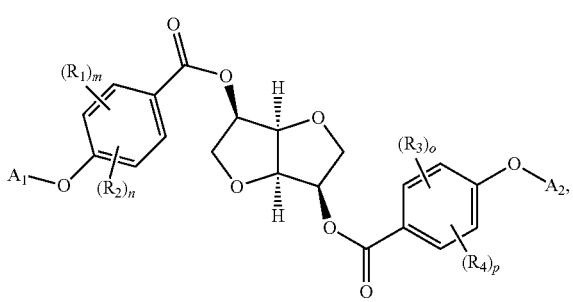

(IA)

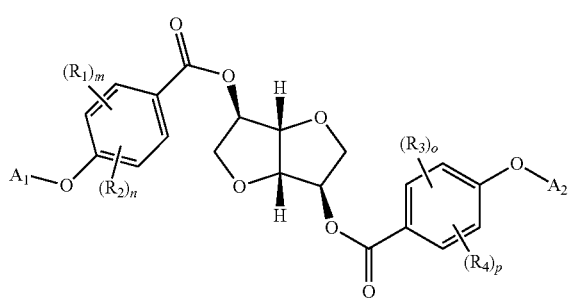

(IA')

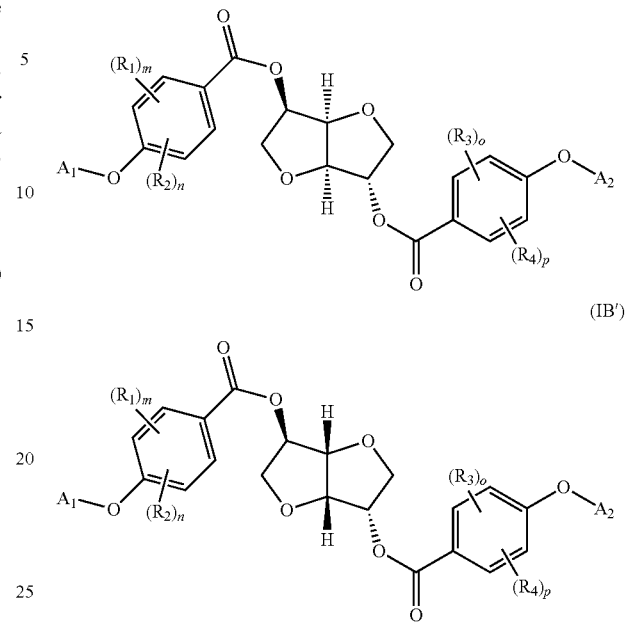

In each of the above formulae (IA), (IA'), (IB) and (IB'):

$R_1$, $R_2$, $R_3$, and $R_4$ each independently denote $C_1$-$C_6$ alkyl and $C_1$-$C_6$ alkoxy;

$A_1$ and $A_2$ each independently denote a group of formula —$[(CH_2)_y$—O$]_z$—C(O)—CH=CH$_2$;

m, n, o, and p each independently denote 0, 1, or 2;

y denotes 0, 1, 2, 3, 4, 5, or 6; and z equals 0 if y equals 0 and z equals 1 if y equals 1 to 6.

In one embodiment of the compounds of formulae (IA), (IA'), (IB) and (IB') (and of compounds of formula (I)), $R_1$, $R_2$, $R_3$ and $R_4$ each independently denote $C_1$-$C_3$ alkyl (i.e., methyl, ethyl, propyl or isopropyl). In an alternative embodiment, $R_1$, $R_2$, $R_3$, $R_4$, in formulae (IA), (IA'), (IB) and (IB') (and in formula (I)) each independently denote $C_1$-$C_3$ alkoxy (i.e., methoxy, ethoxy, propoxy or isopropoxy). Among alkyl and alkoxy groups methyl and methoxy groups are preferred.

In another embodiment of the compounds of formula (I) and of formulae (IA), (IA'), (IB) and (IB'), $R_1$, $R_2$, $R_3$ and $R_4$ each independently denote methyl or ethyl (preferably methyl); and the sum (m+n) is 0 or 1 and the sum (o+p) is 0 or 1. In yet another embodiment, $R_1$, $R_2$, $R_3$ and $R_4$ each independently denote methoxy or ethoxy (preferably methoxy); and the sum (m+n) is 0 or 1 and the sum (o+p) is 0 or 1.

Examples of alkyl groups comprising 3 or 4 carbon atoms include isopropyl and butyl. Examples of alkyl groups comprising 6 carbon atoms include hexyl, 2-methylpentyl, 3-methylpentyl, 2,2-dimethylbutyl, and 2,3-dimethylbutyl.

Examples of alkoxy groups comprising 3 or 4 carbon atoms include isopropoxy, but-1-oxy, but-2-oxy, and tert-butoxy. Examples of alkoxy groups comprising 6 carbon atoms include hex-1-oxy, hex-2-oxy, hex-3-oxy, 2-methylpent-1-oxy, 2-methylpent-2-oxy, 2-methylpent-3-oxy, 2-methylpent-4-oxy, 4-methylpent-1-oxy, 3-methylpent-1-oxy, 3-methylpent-2-oxy, 3-methylpent-3-oxy, 2,2-dimethylbut-1-oxy, 2,2-dimethylbut-3-oxy, 2,2-dimethylbut-4-oxy, 4,4-dimethylbut-1-oxy, 2,3-dimethylbut-1-oxy, 2,3-dimethylbut-2-oxy, 2,3-dimethylbut-3-oxy, and 3,4-dimethylbut-1-oxy.

Non-limiting specific examples of chiral dopant compounds B of formula (I) for use in the present invention are provided below.

The one or more chiral dopant compounds B will usually be present in a total concentration of from 0.1% to 30% by weight, e.g., from 0.1% to 25%, or from 0.1% to 20% by weight, based on the total weight of the composition. For example, in the case of inkjet printing the best results will often be obtained with concentrations of from 3% to 10% by weight, e.g., from 5% to 8% by weight, based on the total weight of the polymer composition. The one or more nematic compounds A will often be present in a concentration of from 30% to 50% by weight, based on the total weight of the polymer composition.

The modifying resin for use in the present invention is not particularly limited as long as it is made of one or more polymerizable monomers which comprise an average of at least one ether functionality (—C—O—C—) (e.g., at least two, at least three, at least four, at least five, at least six or at least seven ether functionalities) per polymerizable group and is capable of changing the position of the selective reflection band exhibited by the cured chiral liquid crystal precursor composition on the substrate to a noticeable extent. In this regard, it is preferred for the resin to be capable of shifting the position of the selective reflection band by at least 5 nm, e.g., by at least 10 nm, by at least 20 nm, by at least 30 nm, by at least 40 nm, or by at least 50 nm. This capability depends on various factors such as, inter alia, the components of the chiral liquid crystal precursor composition, for example, the chiral dopant(s) comprised therein, and the presence or absence of functional groups in the modifying resin (and thus on the surface thereof). It is to be appreciated here that the term "polymerizable monomer" as used herein and in the appended claims includes polymerizable oligomers such as, e.g., oligomers which have been formed by polymerizing two or more (e.g. up to 20, up to 30, up to 40, up to 50 or even more) polymerizable monomers and still contain at least one polymerizable group (e.g. at least two or at least three polymerizable groups).

Examples of modifying resins (a) and modifying resins (b) which are suitable for use in the present invention include those made from (one, two, three, four or more) polymerizable monomers, each of which comprises, for example, 0, 1, 2, 3, 4, 5, 6, 7, 8, 9, 10, 15, 20, 25 or more ether functionalities (—C—O—C—) per polymerizable group and which together comprise an average of at least one ether functionality (—C—O—C—) (e.g., at least two, at least three, at least four, at least five, at least six or at least seven ether functionalities) per polymerizable group present in these monomers. In this regard, it is to be appreciated that the polymerizable monomers are not limited to those which are polymerizable by free radical polymerization. Rather, these monomers also include, for example, monomers which are polymerizable by cationic and/or anionic polymerization and/or by polycondensation. Accordingly, non-limiting examples of resins which are suitable for the purposes of the present invention include organic resins such as polyacrylates, polymethacrylates, polyvinylethers, polyvinylesters, polyesters, polyethers, polyamides, polyurethanes, polycarbonates, polysulfones, phenolic resins, epoxy resins, and mixed forms of these resins. Mixed inorganic/organic resins such as silicones (e.g., polyorganosiloxanes) are suitable as well. One particular type of resin that can be used in the present invention are aqueous resins.

Non-limiting examples of modifying resins (a) and (b) for use in the present invention further include those which are made from one or more monomers selected from polyether acrylates, modified polyether acrylates (such as, e.g., amine-modified polyether acrylates), polyester acrylates, modified polyester acrylates (such as, e.g., amine-modified polyester acrylates), hexafunctional polyester acrylates, tetrafunctional polyester acrylates, aromatic difunctional urethane acrylates, aliphatic difunctional urethane acrylates, aliphatic trifunctional urethane acrylates, aliphatic hexafunctional urethane acrylates, urethane monoacrylates, aliphatic diacrylates, bisphenol A epoxy acrylates, modified bisphenol A epoxy acrylates, epoxy acrylates, modified epoxy acrylates (such as, e.g., fatty acid modified epoxy acrylates), acrylic oligomers, hydrocarbon acrylate oligomers, ethoxylated phenol acrylates, polyethylene glycol diacrylates, propoxylated neopentyl glycol diacrylates, diacrylated bisphenol A derivatives, polyethylene glycol diacrylates, propoxylated neopentyl glycol diacrylates, dipropylene glycol diacrylate, tripropylene glycol diacrylate, polyether tetraacrylates, ethoxylated ditrimethylolpropane tetraacrylate, ethoxylated dipentaerythritol hexaacrylate, mixtures of ethoxylated pentaerythritol tri- and tetraacrylates, dipropylene glycol diacrylate, ethoxylated trimethylol propane triacrylates, tripropylene glycol diacrylate, and ethoxylated bisphenol A diacrylates (optionally in combination with one or more monomers which are different from the above monomers, provided that the one or more monomers together comprise an average of at least two ether functionalities per functional group).

Non-limiting specific examples of monomers which can be used for making the modifying resins for use in the present invention are polyethylene glycol diacrylates and polyethylene glycol dimethacrylates which comprise 2, 3, 4, 5, 6, 7, 8, 9, 10, 11, 12, 13, 14, 15, 20, 25 or 30 ethyleneoxy groups, triacrylates and trimethacrylates of ethoxylated trimethylopropane which comprise 2, 3, 4, 5, 6, 7, 8, 9, 10, 11, 12, 13, 14, 15, 20, 25 or ethyleneoxy groups, tetraacrylates and tetramethacrylates of ethoxylated pentaerythritol which comprise 2, 3, 4, 5, 6, 7, 8, 9, 10, 11, 12, 13, 14, 15, 20, 25 or 30 ethyleneoxy groups, and diacrylates and dimethacrylates of ethoxylated bisphenol A which comprise 2, 3, 4, 5, 6, 7, 8, 9, 10, 11, 12, 13, 14, 15, 20, 25 or 30 ethyleneoxy groups, as well as the corresponding propoxylated and mixed ethoxylated/propoxylated monomers.

It is to be appreciated that a part of the polymerizable monomers which are used to prepare the modifying resin (a) for use in the present invention may not contain any ether functionalities at all or may contain less than one ether functionality per polymerizable group. However, in this case the remaining monomer(s) must contain sufficient ether functionalities per polymerizable group to bring the average to the required minimum of one ether functionality per polymerizable group present in the two or more polymerizable monomers. It further is preferred that at least 80 mole-%, e.g., at least 90 mole-%, at least 95 mole-% or 100 mole-% of the one or more polymerizable monomers for making the modifying resins for use in the present invention comprise at least one ether functionality (e.g., at least two ether functionalities or at least three ether functionalities). Further, preferably at least 90 mole-%, e.g., at least 95 mole-% or 100 mole-% of the one or more polymerizable monomers for making the modifying resins comprise at least four ether functionalities.

It further is to be appreciated that a modifying resin for use in the present invention does not have to be completely cured (polymerized) or dry before it is contacted with a chiral liquid crystal precursor composition as long as it is able to withstand the components and in particular, the solvent that may be (and usually will be) present in the (uncured) chiral liquid crystal precursor composition (e.g., that the modifying resin does not get dissolved thereby to any significant extent). The curing of an only partially cured modifying resin may be completed, for example, together with the curing of the chiral liquid crystal precursor (e.g., by UV-radiation).

Figure 2:
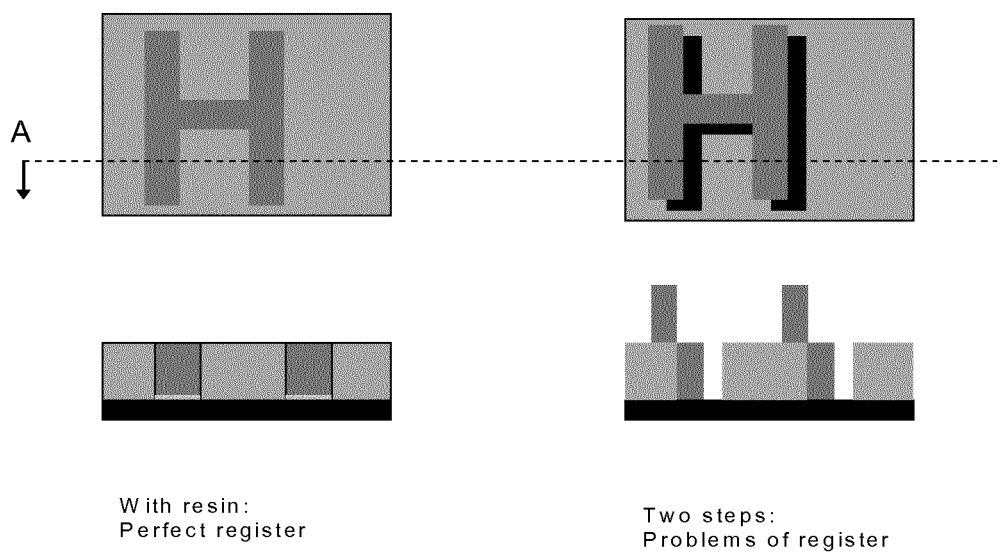
FIG. 2 shows an object of the present invention which uses a modifying resin to create perfect register, compared to other existing technologies.

Another great advantage over the existing prior art (as illustrated in, e.g., WO 2001/024106, WO 2008/127950) is the possibility to create perfect register without using mask techniques. By perfect register it is meant the possibility to have in very few steps and/or process(es) steps a single layer of liquid crystal polymer wherein two or more zones with simultaneously different color shifting properties and/or different positions of the selective reflection band are present, and these zones can be perfectly adjacent without either a gap or an overlap between them, as shown in FIG. 2. This advantage stems from the fact that the liquid crystal precursor composition is applied in one step, and its properties are locally modified by the modifying resin. To obtain a similar result without the instant method, one would have to apply and cure two or more liquid crystal precursor compositions in successive steps with excessively high precision in order for them to cover adjacent regions without gaps or overlaps (as shown in FIG. 2). The instant method allows straightforward creation of logo, marking, coding, barcode, pattern, data matrix which contains different information and/or color at the same time. The possibilities afforded by the instant method include using mixtures of modifying resins (e.g., mixtures of two, three, four or more modifying resins), both in the form of cured physical mixtures of two or more modifying resins and in the form of two or more different modifying resins which are (separately) present on different locations of the surface of the substrate. Alternatively or additionally, two or more different chiral liquid crystal precursor compositions which differ, for example, in the concentration of chiral dopant(s) B and/or with respect to the type of chiral dopant(s) B therein may also be used. This gives rise to a large number of possible combinations of chiral liquid crystal precursor compositions and modifying resins which may be present on the surface of a single substrate. This large number of possible combinations allows, among others, the possibility of creating a specific code and/or marking which is difficult to counterfeit because anyone who wants to reproduce it would have to know the exact composition of the chiral liquid crystal precursor composition and the nature of the modifying resin(s). The incorporation of additional specific security elements such as, e.g., near-infrared, infrared and/or UV security elements (known exclusively to the producer of the marking) into the liquid crystal precursor composition and/or into the modifying resin, makes counterfeiting even more difficult. Accordingly, the present invention also contemplates and encompasses the use of chiral liquid crystal precursor compositions and modifying resins which comprise such additional specific security elements.

Further, in some cases it may be desirable to deliberately coat substantially the entire (or at least a large part of the) surface of the substrate with a first (modifying) resin material with modifying properties and to then apply in one or more areas of the thus coated surface a second modifying resin (or even two or more different modifying resins in different areas), where the first and second (and third, etc.) resins differ in their ability to shift the position of the selective reflection band exhibited by the cured chiral liquid crystal precursor composition (or of two or more different cured chiral liquid crystal precursor compositions).

It also is to be appreciated that the present invention is not limited to changing the color shift from a wavelength in the visible range to another wavelength in the visible range of the electromagnetic spectrum. For example, a modifying resin may shift all or a part of the selective reflection band exhibited by a cured chiral liquid crystal precursor composition from the IR range to the visible range or vice versa, or from the visible range to the UV range or vice versa, or from the IR range to the UV range or vice versa. For example, a modifying resin may shift all or a part of the selective reflection band exhibited by a cured chiral liquid crystal precursor composition from the IR range to the visible range, or from the visible range to the UV range, or from the IR range to the UV range.

The chiral liquid crystal precursor composition can be applied onto the surface of the substrate by any suitable method such as, for example, spray coating, knife coating, roller coating, screen coating, curtain coating, gravure printing, flexography, offset printing, dry offset printing, letter-press printing, screen-printing, pad printing, and ink-jet printing (for example, drop-on-demand ink-jet printing, valve-jet printing). In one of the embodiments of the present invention the application (e.g., deposition) of a composition for making the marking or layer and/or a composition for making the modifying resin is carried out with a printing technique such as, e.g., ink-jet printing (continuous, drop-on-demand, etc.), flexography, pad printing, rotogravure printing, screen-printing, etc. Of course, other printing techniques known by those of skill in the art of printing may be used as well. In one of the preferred embodiments of the invention flexography printing is employed both for applying the resin and for applying the chiral liquid crystal precursor composition. In another preferred embodiment of the invention, ink-jet printing techniques are used both for applying the modifying resin and for applying the chiral liquid crystal precursor composition. It is contemplated also that two different techniques can be used respectively to apply the modifying resin and the chiral liquid crystal precursor composition. The industrial ink-jet printers, commonly used for numbering, coding and marking applications on conditioning lines and printing presses, are particularly suitable. Preferred ink-jet printers include single nozzle continuous ink-jet printers (also called raster or multi level deflected printers) and drop-on-demand ink-jet printers, in particular valve-jet printers. The thickness of the applied liquid crystal polymer composition, after curing, according to the above described application techniques, will usually be at least 1 µm, e.g., at least 3 µm, or at least 4 µm, and will usually be not more than 20 µm, e.g., not more than 15 µm, not more than 10 µm, or not more than 6 µm. The thickness of the applied modifying resin, after curing, according to the above described application techniques will usually be at least 1 µm, e.g., at least 3 µm, or at least 5 µm, but will usually be not more than 10 km.

In particular if a polymer composition for use in the present invention (i.e., a composition for making a chiral liquid crystal precursor or a composition for making a modifying resin) is to be applied by the printing techniques set forth above the composition will usually comprise a solvent to adjust its viscosity to a value which is suitable for the employed application (printing) technique. Typical viscosity values for flexographic printing inks are in the range of from about 40 seconds to about 120 seconds using e.g. a cup DIN number 4. Suitable solvents are known to those of skill in the art. Non-limiting examples thereof include low-viscosity, slightly polar and aprotic organic solvents, such as, e.g., methyl ethyl ketone (MEK), acetone, cyclohexanone, ethyl acetate, ethyl 3-ethoxypropionate, and mixtures of two or more thereof.

Further, in particular if a polymer composition for use in the present invention (i.e., a composition for making a chiral liquid crystal precursor or a composition for making a modifying resin) is to be applied by ink-jet printing, the polymer composition will usually also comprise at least one conductivity agent known by those of skill in the art.

If a chiral liquid crystal precursor composition and/or a composition for making a modifying resin for use in the present invention is to be cured/polymerized by UV radiation the composition will also comprise at least one photoinitiator. Non-limiting examples of the many suitable photoinitiators include α-hydroxyketones such as 1-hydroxy-cyclohexyl-phenyl-ketone and a mixture (e.g., about 1:1) of 1-hydroxy-cyclohexyl-phenyl-ketone and one or more of benzophenone, 2-hydroxy-2-methyl-1-phenyl-1-propanone, and 2-hydroxy-1-[4-(2-hydroxyethoxy)phenyl]-2-methyl-1-propanone; phenylglyoxylates such as methylbenzoylformate and a mixture of oxy-phenyl-acetic acid 2-[2-oxo-2-phenyl-acetoxy-ethoxy]-ethyl ester and oxy-phenyl-acetic 2-[2-hydroxy-ethoxy]-ethyl ester; benzyldimethyl ketals such as alpha, alpha-dimethoxy-alpha-phenylacetophenone; α-aminoketones such as 2-benzyl-2-(dimethylamino)-1-[4-(4-morpholinyl)phenyl]-1-butanone and 2-methyl-1-[4-(methylthio)phenyl]-2-(4-morpholinyl)-1-propanone; phosphine oxide and phosphine oxide derivatives such as diphenyl (2,4,6-trimethylbenzoyl)-phosphine oxide; phenyl bis(2,4,6-trimethylbenzoyl) supplied by Ciba; and also thioxanthone derivatives such as Speedcure ITX (CAS 142770-42-1), Speedcure DETX (CAS 82799-44-8), Speedcure CPTX (CAS 5495-84-1-2 or CAS 83846-86-0) supplied by Lambson.

If a polymer composition for use in the present invention (i.e., a composition for making a chiral liquid crystal precursor or a composition for making a modifying resin) is to be cured by a method which is different from irradiation with UV light such as, e.g., by means of high-energy particles (e.g., electron beams), X-rays, gamma-rays, etc. the use of a photoinitiator can, of course, be dispensed with.

It may also be possible or even desirable to cure especially the composition for making a modifying resin thermally. In this case the composition will usually contain at least one thermal polymerization initiator such as, e.g., a peroxide or an azo compound. Other examples of thermal polymerization initiators are well known to those of skill in the art.

A chiral liquid crystal precursor composition and a composition for providing a modifying resin for use in the present invention may also comprise a variety of other optional components which are suitable and/or desirable for achieving a particular desired property of the composition and in general, may comprise any components/substances which do not adversely affect a required property of the composition to any significant extent. Non-limiting examples of such optional components are resins, silane compounds, adhesion promoters, sensitizers for the photoinitators (if present), etc. For example, especially a chiral liquid crystal precursor composition for use in the present invention may comprise one or more silane compounds. Non-limiting examples of suitable silane compounds include optionally polymerizable silanes such as those of formula $R_1R_2R_3$—Si—$R_4$ wherein $R_1$, $R_2$, and $R_3$ independently represent alkoxy and alkoxyalkoxy having a total of from 1 to about 6 carbon atoms and $R_4$ represents vinyl, allyl, $(C_{1-10})$alkyl, (meth)acryloxy$(C_{1-6})$alkyl, and glycidyloxy$(C_{1-6})$alkyl such as, e.g., vinyltriethoxysilane, vinyltrimethoxysilane, vinyltris(2-methoxyethoxy)silane, 3-methacryloxypropyl-trimethoxysilane, octyltriethoxysilane, and 3-glycidyloxypropyl triethoxysilane from the Dynasylan® family supplied by Evonik.

The concentration of the one or more silane compounds, if present, in the liquid crystal precursor composition will usually be from 0.5% to 5% by weight, based on the total weight of the composition.

In order to strengthen the security of the marking or layer according to the present invention a composition for making a modifying resin and/or a composition for making a chiral liquid crystal precursor for use in the present invention may further comprise one or more pigments and/or dyes which absorb in the visible or invisible region of the electromagnetic spectrum and/or one or more pigments and/or dyes which are luminescent and/or one or more magnetic pigments. Non-limiting examples of suitable pigments and/or dyes which absorb in the visible or invisible region of the electromagnetic spectrum include phthalocyanine derivatives. Non-limiting examples of suitable luminescent pigments and/or dyes include lanthanide derivatives. Non-limiting examples of suitable magnetic pigments include particles of transitional metal oxides such as iron and chromium oxides. The presence of pigment(s) and/or dye(s) will enhance and reinforce the security of the marking against counterfeiting.

Following the application (e.g., deposition) of the chiral liquid crystal precursor composition according to the invention onto the substrate the polymer composition is brought to a chiral liquid crystal state having specific optical properties. The term "specific optical properties" is to be understood as a liquid crystal state with a specific pitch that reflects a specific wavelength range (selective reflection band). To that end the chiral liquid crystal precursor composition is heated, the solvent contained in the composition, if present, is evaporated and the promotion of the desired chiral liquid crystal state takes place. The temperature used to evaporate the solvent and to promote the formation of the liquid crystal state depends on the components of the chiral liquid crystal precursor composition and will in many cases range from about 55° C. to about 150° C., preferably from about 60° C. to about 120° C., more preferably from about 60° C. to about 90° C. Examples of suitable heating sources include conventional heating means such as a hot plate, an oven, a stream of hot air and in particular, radiation sources such as, e.g., an IR lamp. The required heating time depends on several factors such as, e.g., the components of the polymer composition, the type of heating device and the intensity of the heating (energy output of the heating device). In many cases a heating time of from about 0.1 s, about 0.5 s, or about 1 second to about 30 seconds such as, e.g., not more than about 20 seconds, not more than about 10 seconds, or not more than about 5 seconds will be sufficient.

The marking according to the present invention is finally obtained by curing and/or polymerizing the (entire) composition in the chiral liquid crystal state. The fixing or hardening will often be performed by irradiation with UV-light, which induces polymerization of the polymerizable groups present in the polymer composition.

Accordingly, an entire process for making a marking of the present invention may comprise the following steps:
Applying a modifying resin onto a substrate;
Curing and/or drying the applied modifying resin at least partially, for instance fully;
Applying a salt-free liquid crystal precursor composition which comprises one or more chiral dopant compounds B of formula (I) onto a portion of the substrate that has the modifying resin thereon;

Heating the applied liquid crystal precursor composition to bring it to the cholesteric state.

Curing the heated liquid crystal precursor composition (and optionally, completing the curing and/or drying of the modifying resin) to obtain the marking according to the present invention.

The marking according to the present invention can be incorporated, for example, in a security feature, an authenticity feature, an identification feature or a tracking and tracing feature.

The following examples are intended to illustrate the invention without restricting it.

EXAMPLES

Preparation of a Chiral Liquid Crystal Precursor Composition

A chiral liquid crystal precursor composition was prepared as follows, the indicated percentages being by weight based on the total weight of the composition:

A chiral dopant compound B of formula (I) shown above (3%), a nematic compound A (47%), and cyclopentanone (47.5%) were placed into a flask which was thereafter heated until a solution was obtained. To the solution were added 2-methyl-1 [4-(methylthio)phenyl]-2-morpholinopropan-1-one (Irgacure 907® from Ciba, photoinitiator, 1.5%) and a surface additive (1%). The final mixture was stirred until complete dissolution was achieved to result in the chiral liquid crystal precursor composition.

Preparation of a Layer of a Cured Chiral Liquid Crystal Precursor Composition

The above precursor composition was coated on black paper substrate functionalized in some areas with a modifying resin (UV curable varnish) of the following formula (II):
15% Genomer 5275 (acrylated oligoamine resin, available from RHAN for improving the solvent resistance, etc. of the modifying resin)
80% SR344 (polyethylene glycol (400) diacrylate, available from SARTOMER)
5% Esacure Kip 160 (photoinitiator, oligo[2-hydroxy-2-methyl-1-[4-(1-methylvinyl)phenyl]propanone, available from ESACURE)

The resultant layer of precursor composition was heated to about 80° C. for about 10 seconds to evaporate the solvent and to develop a cholesteric liquid crystal phase, i.e., a state that shows a specific reflection band whose position depends on the concentration of the chiral dopant compound B in the composition. Thereafter the composition was cured by irradiation with a UV lamp (mercury low-pressure lamp having a UV irradiance of 10 mW/cm$^2$) for about 1 second to freeze the cholesteric liquid crystal phase through co-polymerization of the polymerizable groups of compounds A and B. After the curing the composition was substantially free of solvent (only trace amounts of cyclopentanone were present) and comprised the above components (in polymerized form) in the following weight percentages, based on the total weight of the composition:
89.5% Compound A (nematic precursor)
5.7% Compound B (chiral dopant)
2.8% Photoinitiator
2% Additive The concentration of chiral dopant compound B in the cholesteric liquid crystal precursor allows to control the position of the selective reflection band and as a result thereof, the color of the cured chiral liquid crystal precursor layer. This is illustrated by FIG. 1 which is a plot of the wavelength of the maximum normal reflection as a function of the concentration of a chiral dopant compound B in the dry composition. With 5.7% of the specific chiral dopant used in the precursor composition the wavelength of the maximum normal reflection of the composition is around 533 nm, which affords a green color of the corresponding layer. As shown in FIG. 1, increasing (decreasing) the concentration of chiral dopant compound B in the composition results in a decrease (increase) of the wavelength of the maximum normal reflection.

Where present on top of the modifying resin, the reflection band is shifted towards higher wavelengths and in this example the maximum normal reflection of the composition is around 620 nm as measured with the LabSpec Pro device made by Analytical Spectral Devices Inc. of Boulder, Colo. Both the unmodified color shift (550 nm) and the modified color shift (620 nm) show an increased reflection intensity providing a better color contrast as well as a development time substantially decrease (heating time required to develop the chiral liquid crystal phase) compare to the substrate disclosed in US 2012/0141697 A1.

The black paper substrate is obtainable by flexography printing of a layer of a UV curable conventional black ink as for example the UV black ink "process black" (available from SIEGWERK) on a white paper (90 gr, available from GASCOGNE LAMINATES). The functtionalization is made by flexography printing of the UV curable varnish composition set forth above and subsequent curing thereof.

The following compounds may, for example, be employed in the above Examples as chiral dopant compound B of formula (I):
(3R,3aR,6R,6aR)-hexahydrofuro[3,2-b]furan-3,6-diyl bis (4-(4-(acryloyloxy)-3-methoxybenzoyloxy)-3-methoxybenzoate);
(3R,3aR,6R,6aR)-6-(4-(4-(acryloyloxy)-3-methoxybenzoyloxy)-3-methoxybenzoyloxy)-hexahydrofuro[3,2-b]furan-3-yl 4-(4-(acryloyloxy)benzoyloxy)-3-methoxybenzoate;
(3R,3aR,6R,6aR)-hexahydrofuro[3,2-b]furan-3,6-diyl bis (4-(4(acryloyloxy)benzoyloxy)-benzoate);
(3R,3aR,6R,6aR)-hexahydrofuro[3,2-b]furan-3,6-diyl bis (4-(4-(acryloyloxy)butoxy)-benzoate);
(3R,3aR,6R,6aR)-hexahydrofuro[3,2-b]furan-3,6-diyl bis (4-(acryloyloxy)-2-methylbenzoate);
(3R,3aS,6S,6aS)-hexahydrofuro[3,2-b]furan-3,6-diyl bis(4-(4-(acryloyloxy)butoxy)benzoate);
(3R,3aS,6S,6aS)-hexahydrofuro[3,2-b]furan-3,6-diyl bis(4-(acryloyloxy)-2-methylbenzoate);
(3R,3aS,6R,6aS)-hexahydrofuro[3,2-b]furan-3,6-diyl bis(4-(4-(acryloyloxy)butoxy)benzoate);
(3R,3aS,6R,6aS)-hexahydrofuro[3,2-b]furan-3,6-diyl bis(4-(acryloyloxy)-2-methylbenzoate);
(3R,3aS,6R,6aS)-hexahydrofuro[3,2-b]furan-3,6-diyl bis(4-(acryloyloxy)benzoate).

As nematic compound A in the above Examples the following compounds may, for example, be employed:
benzoic acid, 4-[[[4-[(1-oxo-2-propen-1-yl)oxy]butoxy]carbonyl]oxy]-1,1'-(2-methyl-1,4-phenylene) ester;
2-methoxybenzene-1,4-diyl bis[4-({[4-(acryloyloxy)butoxy]carbonyl}oxy)benzoate];

4-{[4-({[4-(acryloyloxy)butoxy]carbonyl}oxy)benzoyl]oxy}-2-methoxyphenyl 4-({[4-(acryloyloxy)butoxy]carbonyl}oxy)-2-methylbenzoate;

2-methoxybenzene-1,4-diyl bis[4-({[4-(acryloyloxy)butoxy]carbonyl}oxy)-2-methylbenzoate];

2-methylbenzene-1,4-diyl bis[4-({[4-(acryloyloxy)butoxy]carbonyl}oxy)-2-methylbenzoate];

4-{[4-({[4-(acryloyloxy)butoxy]carbonyl}oxy)benzoyl]oxy}-2-methylphenyl 4-({[4-(acryloyloxy)butoxy]carbonyl}oxy)-3-methoxybenzoate;

2-methylbenzene-1,4-diyl bis[4-({[4-(acryloyloxy)butoxy]carbonyl}oxy)benzoate];

2-methylbenzene-1,4-diyl bis[4-({[4-(acryloyloxy)butoxy]carbonyl}oxy)-3-methoxybenzoate];

4-{[4-({[4-(acryloyloxy)butoxy]carbonyl}oxy)-3-methoxybenzoyl]oxy}-2-methylphenyl 4-({[4-(acryloyloxy)butoxy]carbonyl}oxy)-3,5-dimethoxybenzoate;

2-methylbenzene-1,4-diyl bis[4-({[4-(acryloyloxy)butoxy]carbonyl}oxy)-3,5-dimethoxybenzoate];

2-methoxybenzene-1,4-diyl bis[4-({[4-(acryloyloxy)butoxy]carbonyl}oxy)-3,5-dimethoxybenzoate];

4-{[4-({[4-(acryloyloxy)butoxy]carbonyl}oxy)-3-methoxybenzoyl]oxy}-2-methoxyphenyl 4-({[4-(acryloyloxy)butoxy]carbonyl}oxy)-3,5-dimethoxybenzoate;

2-methyl-1,4-phenylene bis(4-(4-(acryloyloxy)butoxy)-benzoate);

4-({4-[4-(acryloyloxy)butoxy]benzoyl}oxy)-3-methylphenyl 4-[4-(acryloyloxy)butoxy]-2-methylbenzoate;

4-({4-[4-(acryloyloxy)butoxy]benzoyl}oxy)-3-methylphenyl 4-[4-(acryloyloxy)butoxy]-3-methylbenzoate;

2-methylbenzene-1,4-diyl bis {4-[4-(acryloyloxy)butoxy]-2-methylbenzoate};

4-({4-[4-(acryloyloxy)butoxy]-2-methylbenzoyl}oxy)-3-methylphenyl 4-[4-(acryloyl-oxy)butoxy]-2,5-dimethylbenzoate;

2-methylbenzene-1,4-diyl bis {4-[4-(acryloyloxy)butoxy]-2,5-dimethylbenzoate}2-methylbenzene-1,4-diyl bis {4-[4-(acryloyloxy)butoxy]benzoate};

4-({4-[4-(acryloyloxy)butoxy]-3,5-dimethylbenzoyl}oxy)-3-methylphenyl 4-[4-(acryloyloxy)butoxy]-2,5-dimethylbenzoate;

2-methylbenzene-1,4-diyl bis {4-[4-(acryloyloxy)butoxy]-3,5-dimethylbenzoate};

2-methoxybenzene-1,4-diyl bis {4-[4-(acryloyloxy)butoxy]-3,5-dimethylbenzoate};

4-({4-[4-(acryloyloxy)butoxy]-3-methylbenzoyl}oxy)-2-methoxyphenyl 4-[4-(acryloyl-oxy)butoxy]-3,5-dimethylbenzoate;

2-methoxybenzene-1,4-diyl bis {4-[4-(acryloyloxy)butoxy]-3-methylbenzoate};

4-({4-[4-(acryloyloxy)butoxy]benzoyl}oxy)-3-methoxyphenyl 4-[4-(acryloyloxy)-butoxy]-3-methylbenzoate;

4-({4-[4-(acryloyloxy)butoxy]benzoyl}oxy)-3-methoxyphenyl 4-[4-(acryloyloxy)-butoxy]-2,5-dimethylbenzoate;

2-methoxybenzene-1,4-diyl bis {4-[4-(acryloyloxy)butoxy]-2-methoxybenzoate};

2-methoxybenzene-1,4-diyl bis {4-[4-(acryloyloxy)butoxy]-3,5-dimethoxybenzoate};

2-methoxybenzene-1,4-diyl bis {4-[4-(acryloyloxy)butoxy]-3-methoxybenzoate};

2-ethoxybenzene-1,4-diyl bis {4-[4-(acryloyloxy)butoxy]benzoate};

2-ethoxybenzene-1,4-diyl bis {4-[4-(acryloyloxy)butoxy]-2-methylbenzoate};

2-(propan-2-yloxy)benzene-1,4-diyl bis {4-[4-(acryloyloxy)butoxy]benzoate};

4-({4-[4-(acryloyloxy)butoxy]benzoyl}oxy)-2-(propan-2-yloxy)phenyl 4-[4-(acryloyl-oxy)butoxy]-2-methylbenzoate;

2-(propan-2-yloxy)benzene-1,4-diyl bis {4-[4-(acryloyloxy)butoxy]-2-methylbenzoate};

2-(propan-2-yloxy)benzene-1,4-diyl bis {4-[4-(acryloyloxy)butoxy]-2,5-dimethylbenzoate};

2-(propan-2-yloxy)benzene-1,4-diyl bis {4-[4-(acryloyloxy)butoxy]-3,5-dimethylbenzoate}; and 2-(propan-2-yloxy)benzene-1,4-diyl bis {4-[4-(acryloyloxy)butoxy]-3,5-dimethoxybenzoate}.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A substrate having thereon a marking or layer comprising a chiral liquid crystal precursor composition that is cured, wherein the chiral liquid crystal precursor composition is salt-free and comprises (i) one or more nematic compounds A and (ii) one or more chiral dopant compounds B which are capable of giving rise to a cholesteric state of the chiral liquid crystal precursor composition and are of formula (I):

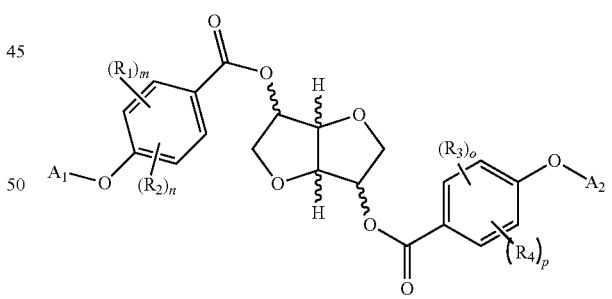

(I)

wherein:

$R_1$, $R_2$, $R_3$, and $R_4$ each independently denote $C_1$-$C_6$ alkyl and $C_1$-$C_6$ alkoxy;

$A_1$ and $A_2$ each independently denote a group of formula —[(CH$_2$)$_y$—O]$_z$—C(O)—CH=CH$_2$;

m, n, o, and p each independently denote 0, 1, or 2;

y denotes 0, 1, 2, 3, 4, 5, or 6; and z equals 0 if y equals 0 and z equals 1 if y equals 1 to 6;

wherein a modifying resin with ether functionalities comprising at least one unit of formula (II):

(II)

wherein q is 0 or an integer of from 1 to 4, r is an integer of from 2 to 20, and $R_5$ and $R_6$ are each independently hydrogen or $C_{1-4}$ alkyl
is disposed between the substrate and the marking or layer and in contact with the marking or layer in one or more areas thereof, the modifying resin increasing a position of a selective reflection band exhibited by the chiral liquid crystal precursor composition that is cured on the substrate in the one or more areas; and wherein the marking or layer covers at least one area of the substrate not carrying the modifying resin.

2. The substrate of claim 1, wherein the one or more nematic compounds A comprise at least one compound that comprises at least one polymerizable group.

3. The substrate of claim 2, wherein the at least one polymerizable group comprises a group of formula $H_2C=CH-C(O)-$.

4. The substrate of claim 1, wherein y in formula (I) equals 0.

5. The substrate of claim 1, wherein in formula (I) the total number of carbon atoms in $R_1$, $R_2$, $R_3$, and $R_4$ does not exceed 8.

6. The substrate of claim 1, wherein in formula (I) at least two of m, n, o, and p denote 0.

7. The substrate of claim 1, wherein in formula (I) $R_1$, $R_2$, $R_3$, and $R_4$ each independently denote $C_1$-$C_3$ alkyl and $C_1$-$C_3$ alkoxy.

8. The substrate of claim 1, wherein the ether functionalities are provided by alkyleneoxy units having from 2 to 4 carbon atoms.

9. The substrate of claim 1, wherein at least a part of the ether functionalities is provided by ethyleneoxy groups.

10. The substrate of claim 1, wherein the modifying resin comprises a dried aqueous resin.

11. The substrate of claim 1, wherein the modifying resin increases shifts a position of the selective reflection band exhibited by the chiral liquid crystal precursor composition that is cured, by at least 5 nm.

12. The substrate of claim 1, wherein at least a part of the selective reflection band exhibited by the chiral liquid crystal precursor composition that is cured and has been increased shifted by the modifying resin is in the visible range.

13. A method of providing a marking on a substrate, wherein the method comprises:

a) applying onto a surface of the substrate a chiral liquid crystal precursor composition that is salt-free, wherein the substrate carries a modifying resin with ether functionalities comprising at least one unit of formula (II):

wherein q is 0 or an integer of from 1 to 4, r is an integer of from 2 to 20, and $R_5$ and $R_6$ are each independently hydrogen or $C_{1-4}$ alkyl
in one or more areas of the surface of the substrate, wherein the chiral liquid crystal precursor composition comprises (i) one or more nematic compounds A and (ii) one or more chiral dopant compounds B which are capable of giving rise to a cholesteric state of the chiral liquid crystal precursor composition and are of formula (I):

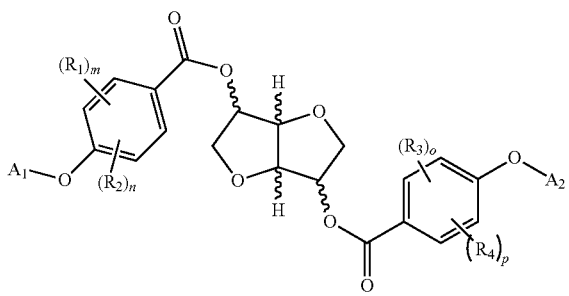

wherein:

$R_1$, $R_2$, $R_3$, and $R_4$ each independently denote $C_1$-$C_6$ alkyl and $C_1$-$C_6$ alkoxy;

$A_1$ and $A_2$ each independently denote a group of formula $-[(CH_2)_y-O-]_z-C(O)-CH+CH_2$;

m, n, o, and p each independently denote 0, 1, or 2;

y denotes 0, 1, 2, 3, 4, 5, or 6; and z equals 0 if y equals 0 and z equals 1 if y equals 1 to 6;

in such a way that the composition covers at least a part of the one or more areas carrying the modifying resin and also covers at least one area of the surface that does not carry the modifying resin, b) heating the chiral liquid crystal precursor composition to bring the chiral liquid crystal precursor composition to a chiral liquid crystal state; and c) curing the chiral liquid crystal precursor composition in the chiral liquid crystal state; and wherein the modifying resin increases a position of the selective reflection band exhibited by the chiral liquid precursor composition that has been cured on the substrate in the one or more areas in which the modifying resin is present.

14. A substrate obtainable by the method of claim 13.

15. A method of changing increasing a position of a selective reflection band exhibited by a chiral liquid crystal precursor composition that is cured, wherein the chiral liquid crystal precursor composition is salt-free and comprises (i) one or more nematic compounds A and (ii) one or more chiral dopant compounds B which are capable of giving rise to a cholesteric state of the chiral liquid crystal precursor composition and are of formula (I):

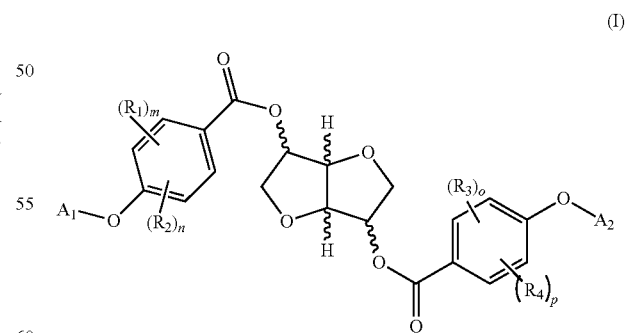

wherein:

$R_1$, $R_2$, $R_3$, and $R_4$ each independently denote $C_1$-$C_6$ alkyl and $C_1$-$C_6$ alkoxy;

$A_1$ and $A_2$ each independently denote a group of formula $-[(CH_2)_y-O]_z-C(O)-CH=CH_2$;

m, n, o, and p each independently denote 0, 1, or 2;

y denotes 0, 1, 2, 3, 4, 5, or 6; and z equals 0 if y equals 0 and z equals 1 if y equals 1 to 6;

and wherein the method comprises contacting the composition with a modifying resin which is with ether functionalities comprising at least one unit of formula (II):

—[CH($R_5$)—(CH($R_6$))q-O]r-     (II)

wherein q is 0 or an integer of from 1 to 4, r is an integer of from 2 to 20, and $R_5$ and $R_6$ are each independently hydrogen or $C_{1-4}$ alkyl and is capable of changing a position of a selective reflection band exhibited by the chiral liquid crystal precursor composition that is cured.

16. The method of claim 15, wherein a position of the selective reflection band is increased by the modifying resin by at least 5 nm.

17. The method of claim 15, wherein the chiral liquid crystal precursor composition that is cured is adapted to form part of a marking on a substrate.

\* \* \* \* \*

UNITED STATES PATENT AND TRADEMARK OFFICE
CERTIFICATE OF CORRECTION

Page 1 of 1

PATENT NO. : 10,611,919 B2
APPLICATION NO. : 15/034885
DATED : April 7, 2020
INVENTOR(S) : Tristan Jauzein and Sabine Mayade It is certified that error appears in the above-identified patent and that said Letters Patent is hereby corrected as shown below:

On the Title Page

In Item (30) the Foreign Application Priority Data change "Nov 8, 2013 [WO] PCT/EP2014/073890" to -- Nov 8, 2013 [EP] PCT/EP2013/073435 --.

Signed and Sealed this
Twenty-sixth Day of May, 2020

Andrei Iancu
*Director of the United States Patent and Trademark Office*